UNITED STATES PATENT OFFICE.

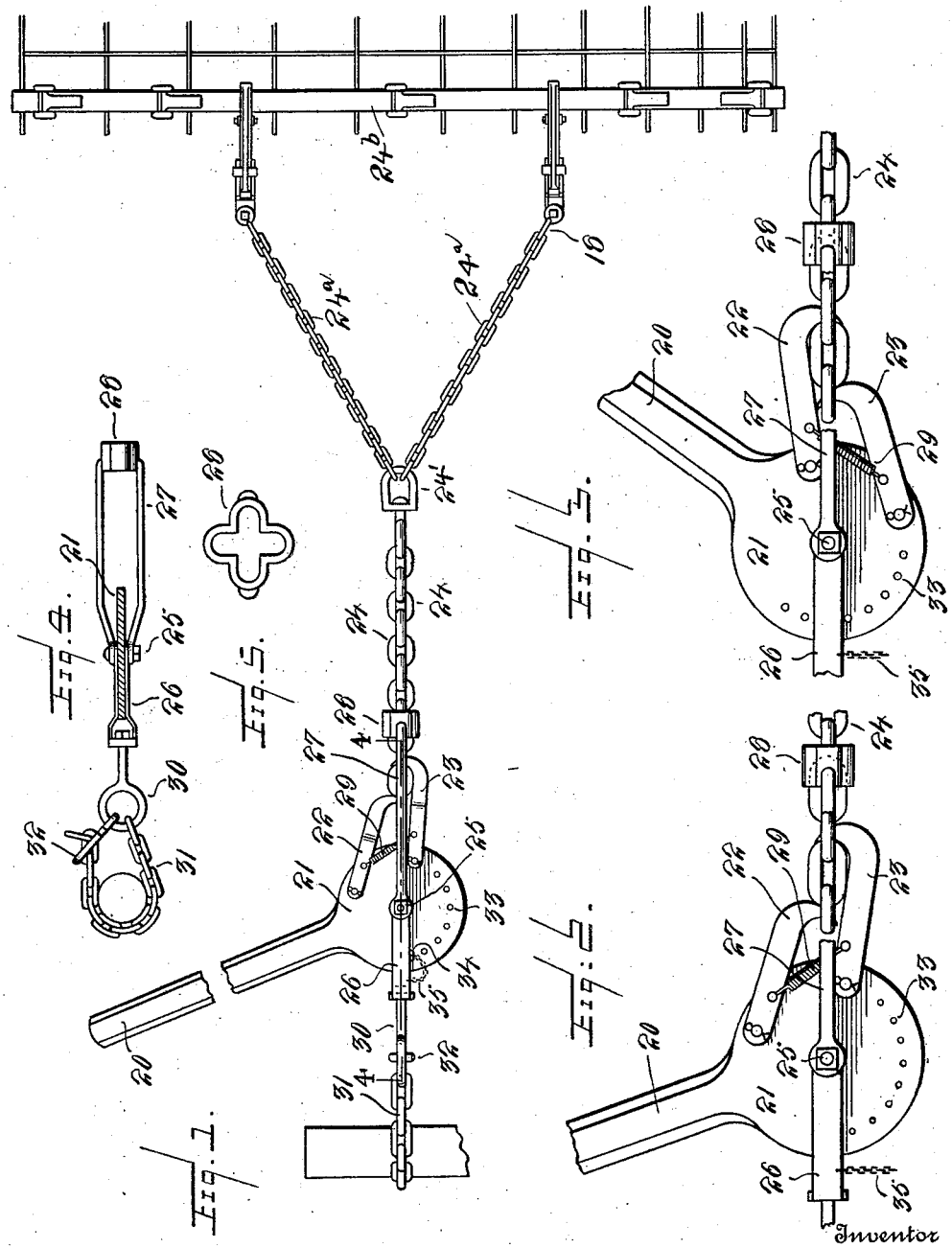

CHRISTOPHER W. SCHUMANN, OF MARSHALLTOWN, IOWA.

WIRE-STRETCHER.

1,021,635.   Specification of Letters Patent.   Patented Mar. 26, 1912.

Application filed May 5, 1911. Serial No. 625,401.

*To all whom it may concern:*

Be it known that I, CHRISTOPHER W. SCHUMANN, a citizen of the United States, residing at Marshalltown, in the county of Marshall and State of Iowa, have invented new and useful Improvements in Wire-Stretchers, of which the following is a specification.

This invention relates to wire stretchers, and its object is to provide a simple, reliable and efficient device of this character whereby all the line wires of a fence may be readily, conveniently and uniformly stretched.

The invention consists of the features of construction, combination and arrangement of parts hereinafter fully described and claimed, reference being had to the accompanying drawings, in which:

Figure 1 is a side elevation of a wire stretcher embodying my invention, shown as applied in use. Fig. 2 is a detail side elevation of the stretcher lever with the hook members connected to the independent links of a chain. Fig. 3 is a similar view, showing another position of the hooks connected to different links of the chain. Fig. 4 is a sectional plan view taken substantially on the line 4—4 of Fig. 1. Fig. 5 is an end view of the guide member of the guide yoke.

The stretching lever 20 is provided with a disk or head 21 having oppositely disposed hooks 22 and 23 pivotally connected thereto above and below its center, said hooks being adapted to engage different links of a stretcher chain 24 connected with the swivel 24', coupled by chains 24ª with a wire clamping device 24ᵇ. The disk 21 is provided with a central pivot pin or bolt 25 on which it is fulcrumed for movement and which connects therewith a rearwardly extending draft yoke 26 and a forwardly extending guide yoke 27, which latter is provided at its outer or forward end with a guide 28 for the passage of the links of the chain 24. The hooks 22 and 23 are adapted to engage links of the chain 24 between the arms of the yoke 27 and are connected by a coiled spring 29, whereby they are held in proper relative operative position. Swiveled in the cross bar of the yoke 27 is a connecting member 30 to which is secured an anchor chain 31, adapted to be passed one or more times around a post or other suitable anchoring support and engaged by a hook 32 carried by the member 30, whereby the chain is held fast about the support.

A series of perforations 33 is formed in the disk 21 mainly below the center thereof and in rear of the hooks to receive a locking pin 34 secured to the yoke 26 by a chain 35. This pin may be engaged with any of the perforations and is adapted to bear against the draft yoke to hold the lever against movement to maintain the stretcher in set position and the wire stretched to any desired tension.

In operation, the clamp is applied to the line wires of the fence and the draft chain is attached to the anchor post and the hooks engaged with the chain 24. By then manipulating the lever, the hooks 22 and 23 will be alternately advanced and retracted to engage separate links of the chain 24, whereby said chain will be intermittently taken up and drawn rearwardly until the fence wires are stretched to the proper tension, when the stretcher may be held fixed by the pin 34 against the release of the wires while the latter are being fastened.

It will be seen that the structure is such as to secure a powerful and effective stretching action and to enable the parts of the stretcher to be conveniently applied for use and removed after use and connected with and disconnected from each other for service and compactness of storage in transportation, etc.

Having thus described the invention, what I claim is:

1. A stretching apparatus comprising a lever having a disk or head, a pin or bolt passing centrally therethrough, forwardly and rearwardly projecting draft and guide yokes connected with said pin or bolt, an anchoring member connected with the draft yoke, oppositely disposed pivoted hooks upon the disk or head to engage independent links of a chain passing through the guide yoke, and a spring connecting said hooks to maintain them in normal operative position.

2. A stretching apparatus comprising a lever having a disk or head, a pin or bolt passing centrally therethrough, forwardly and rearwardly projecting draft and guide yokes connected with said pin or bolt, an anchoring member connected with the draft yoke, oppositely disposed pivoted hooks upon the disk or head to engage independent links of a chain passing through the guide yoke, a spring connecting said hooks to maintain them in normal operative position, and a locking device carried by the draft yoke to adjustably engage the lever and bear upon said yoke to maintain the lever in stretching position.

In testimony whereof I affix my signature in presence of two witnesses.

CHRISTOPHER W. SCHUMANN.

Witnesses:
W. D. BUCHHOLZ,
F. H. WELLENDORF.